United States Patent
Tiedemann, Jr.

(10) Patent No.: US 8,619,543 B2
(45) Date of Patent: *Dec. 31, 2013

(54) METHOD AND APPARATUS FOR WALSH SPACE ASSIGNMENT IN A COMMUNICATION SYSTEM

(75) Inventor: Edward G. Tiedemann, Jr., Concord, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 12/537,094

(22) Filed: Aug. 6, 2009

(65) Prior Publication Data

US 2010/0202283 A1  Aug. 12, 2010

Related U.S. Application Data

(63) Continuation of application No. 10/079,782, filed on Feb. 19, 2002, now Pat. No. 7,596,082.

(60) Provisional application No. 60/297,105, filed on Jun. 7, 2001.

(51) Int. Cl.
*H04J 11/00* (2006.01)
*H04B 7/216* (2006.01)

(52) U.S. Cl.
USPC .......................................... 370/209; 370/335

(58) Field of Classification Search
None
See application file for complete search history.

(56) References Cited

U.S. PATENT DOCUMENTS

| 4,807,224 | A | * | 2/1989 | Naron et al. | 370/218 |
| 5,619,525 | A | * | 4/1997 | Wiedeman et al. | 375/130 |
| 5,867,109 | A | * | 2/1999 | Wiedeman | 455/13.1 |
| 5,907,582 | A | * | 5/1999 | Yi | 375/259 |
| 6,023,606 | A | * | 2/2000 | Monte et al. | 455/13.1 |
| 6,272,325 | B1 | * | 8/2001 | Wiedeman et al. | 455/117 |
| 6,317,413 | B1 | | 11/2001 | Honkasalo | |

(Continued)

FOREIGN PATENT DOCUMENTS

| CA | 2282979 A1 | 5/2000 |
| CN | 1256813 | 6/2000 |

(Continued)

OTHER PUBLICATIONS

Chih-Lin I at eL, "Load and Interference Based Demand Assignment (LIDA) For Integrated Services in CDMA Wireless Systems," IEEE 236-241, (1996).

Chih-Lin I at al., "Performance of Multi-Code CDMA Wireless Personal Communications Networks." vol. 2 US Conf. 45 IEEE 907-911, (1995).

(Continued)

*Primary Examiner* — Gregory Sefcheck
(74) *Attorney, Agent, or Firm* — Rupit M. Patel

(57) ABSTRACT

Techniques for Walsh space assignment are disclosed. In one aspect, a list of Walsh functions is maintained in the base station and mobile stations. A Walsh space indicator is transmitted to indicate which of the Walsh functions on the list are to be used in communication. The Walsh space indicator is updated according to the dynamically varying transmit power available or the use of Walsh functions within the base station. Methods by which a mobile station can request Walsh space information are provided. In another aspect, a Walsh space indicator channel is continually broadcast for mobile stations to detect the Walsh space indicator therefrom. In yet another aspect, the Walsh space indicator is used to initialize convolutional encoders and decoders, to provide a mechanism for mitigating against errors introduced while receiving Walsh space indicators. Various other aspects are also presented.

51 Claims, 8 Drawing Sheets

(56) References Cited

U.S. PATENT DOCUMENTS

| | | | |
|---|---|---|---|
| 6,335,922 | B1 | 1/2002 | Tiedemann, Jr. et al. |
| 6,337,983 | B1* | 1/2002 | Bonta et al. ............... 455/437 |
| 6,473,395 | B1* | 10/2002 | Lee ............... 370/209 |
| 6,477,157 | B1* | 11/2002 | Kim et al. ............ 370/331 |
| 6,504,832 | B1 | 1/2003 | Koo et al. |
| 6,804,216 | B1 | 10/2004 | Kuwahara et al. |
| 6,831,909 | B1 | 12/2004 | Koo et al. |
| 6,873,831 | B2 | 3/2005 | Attar et al. |
| 6,930,981 | B2 | 8/2005 | Gopalakrishnan et al. |
| 6,961,304 | B1* | 11/2005 | Rudrapatna et al. ......... 370/209 |
| 7,012,886 | B2 | 3/2006 | Meier et al. |
| 7,313,407 | B2 | 12/2007 | Shapira |
| 7,408,894 | B2 | 8/2008 | Kim et al. |
| 7,596,082 | B2 | 9/2009 | Tiedemann, Jr. |
| 2002/0110101 | A1* | 8/2002 | Gopalakrishnan et al. ... 370/335 |
| 2002/0172168 | A1* | 11/2002 | Meier et al. ............ 370/335 |
| 2003/0129989 | A1 | 7/2003 | Gholmieh et al. |
| 2004/0063431 | A1 | 4/2004 | Julka et al. |

FOREIGN PATENT DOCUMENTS

| | | |
|---|---|---|
| EP | 1189375 | 3/2002 |
| JP | 10-107770 | 4/1998 |
| JP | 10145282 | 5/1998 |
| JP | 11331943 A | 11/1999 |
| JP | 200-152343 | 5/2000 |
| JP | 2001008262 A | 1/2001 |
| JP | 2002111629 A | 4/2002 |
| WO | WO98032263 | 7/1998 |
| WO | 9913599 | 3/1999 |
| WO | 9945669 | 9/1999 |
| WO | WO0024157 A1 | 4/2000 |
| WO | WO0137506 A1 | 5/2001 |

OTHER PUBLICATIONS

LG Electronics, et al., "Updated Joint Physical Layer Proposal For 1xEV-DV," pp. 1-87, 3GPP2-C50-20010611-009 (Jun. 11, 2001).

LG Electronics, et al., "Results of L3NQS Simulation Study," pp. 1-215, 3GPP2-C-50-20010820-011 (Aug. 20, 2001).

LG Electronics, et al., "System Simulation Results For The L3NQS Framework Proposal For cdma2000 1xEVDV," pp. 1-123, 3GPP2-C-50-20010820-012 (Aug. 20, 2001).

International Search Report, PCT/US2002/017817—International Search Authority—European Patent Office—Jun. 4, 2003.

International Preliminary Examination Report, PCT/US2002/017817, International Preliminary Examining Authority—US—Dec. 22, 2005.

3GPP2,High-Speed Data Enhancements for cdma2000 1x—Integrated Data and Voice,3GPP2 S.R0026 Version 1.0. Oct. 17, 2000.

Braithwaite,"Using Walsh Code Selection to Reduce the Power Variance of Band-Limited Forward-Link DMA",IEEE Journal on selected are as on Communications,2000"11", vol. 18, No. 11,pp. 2260-2269.

Yamada,"cdma2000 Overview and LSI Implementation," Technical Report of the Institute of Electronics, Information and Communication Engineers, Japan, Oct. 16, 2000, vol. 100, No. 386, pp. 111-122, DSP 2000-116.

Lucent Technologies., Context sensitive modulation and coding sets, 3GPP R1-01-0083, Jan. 19, 2001.

Motorola: "Partial Chase Combining for Code Management", 3GPP TSGR1-01-0543, May 25 2001.

Motorola: "Recommendation TTI size for HSDPA", 3GPP TSGR1-01-0544, May 25, 2001.

Lucent Technologies, Semi-static Code Space Division of physical HS-DSCH, 3GPP R1-01-0309, Mar. 2, 2001.

* cited by examiner

METHOD AND APPARATUS FOR WALSH SPACE ASSIGNMENT IN A COMMUNICATION SYSTEM

CLAIM OF PRIORITY UNDER 35 U.S.C. §120

The present Application for Patent is a Continuation of U.S. patent application Ser. No. 10/079,782, filed Feb. 19, 2002 and now issued as U.S. Pat. No. 7,596,082 on Sep. 29, 2009, entitled "METHOD AND APPARATUS FOR WALSH SPACE ASSIGNMENT IN A COMMUNICATION SYSTEM" which claims priority of U.S. Provisional Application No. 60/297,105, filed Jun. 7, 2001, assigned to the assignee hereof and hereby expressly incorporated by reference herein.

BACKGROUND

1. Field

The present invention relates generally to communications, and more specifically to a novel and improved method and apparatus for Walsh space assignment in a communication system.

2. Background

Wireless communication systems are widely deployed to provide various types of communication such as voice and data. These systems may be based on code division multiple access (CDMA), time division multiple access (TDMA), or other modulation techniques. A CDMA system provides certain advantages over other types of systems, including increased system capacity.

A CDMA system may be designed to support one or more COMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) some other standards.

In the above named standards, the available spectrum is shared simultaneously among a number of users, and techniques such as soft handoff are employed to maintain sufficient quality to support delay-sensitive services, such as voice. Data services are also available. More recently, systems have been proposed that enhance the capacity for data services by using higher order modulation, very fast feedback of Carrier to Interference ratio (CM) from the mobile station, very fast scheduling, and scheduling for services that have more relaxed delay requirements. An example of such a data-only communication system using these techniques, is the high data rate (HDR) system that conforms to the TIA/EIA/IS-856 standard (the IS-856 standard).

In contrast to the other above named standards, an IS-856 system uses the entire spectrum available in each cell to transmit data to a single user at one time, selected based on link quality. In so doing, the system spends a greater percentage of time sending data at higher rates when the channel is good, and thereby avoids committing resources to support transmission at inefficient rates. The net effect is higher data capacity, higher peak data rates, and higher average throughput.

Systems can incorporate support for delay-sensitive data, such as voice channels or data channels supported in the IS-2000 standard, along with support for packet data services such as those described in the IS-856 standard. One such system is described in a proposal submitted by LG Electronics, LSI Logic, Lucent Technologies, Nortel Networks, QUALCOMM Incorporated, and Samsung to the 3rd Generation Partnership Project 2 (3GPP2). The proposal is detailed in documents entitled "Updated Joint Physical Layer Proposal for 1xEV-DV", submitted to 3GPP2 as document number C50-20010611-009, Jun. 11, 2001; "Results of L3NQS Simulation Study", submitted to 3GPP2 as document number C50-20010820-011, Aug. 20, 2001; and "System Simulation Results for the L3NQS Framework Proposal for cdma2000 1x-EVDV", submitted to 3GPP2 as document number C50-20010820-012, Aug. 20, 2001. These are hereinafter referred to as the 1 xEV-DV proposal.

A system such as the one described in the 1xEV-DV proposal generally comprises channels of four classes: overhead channels, dynamically varying IS-95 and IS-2000 channels, a forward packet data channel (F-PDCH), and some spare channels. The overhead channel assignments vary slowly, they may not change for months. They are typically changed when there are major network configuration changes. The dynamically varying IS-95 and IS-2000 channels are allocated on a per call basis or are used for IS-95, or IS-2000 Release 0 through B packet services. Typically, the available base station power remaining after the overhead channels and dynamically varying channels have been assigned is allocated to the F-PDCH for remaining data services. The F-PDCH is typically used for data services that are less sensitive to delay while the IS-2000 channels are used for more delay-sensitive services.

The F-PDCH, similar to the traffic channel in the 1S-856 standard, is used to send data at the highest supportable data rate to one user in each cell at a time. In IS-856, the entire power of the base station and the entire space of Walsh functions are available when transmitting data to a mobile station. However, in the proposed 1xEV-DV system, some base station power and some of the Walsh functions are allocated to overhead channels and existing IS-95 and cdma2000 services. The data rate that is supportable depends primarily upon the available power and Walsh codes after the power and Walsh codes for the overhead, 1S-95, and IS-2000 channels have been assigned. The data transmitted on the F-PDCH is spread using one or more Walsh codes.

In the proposed scheme, the base station only transmits to one mobile station on the F-PDCH at a time, although many users may be using packet services in a cell. Mobile stations are selected for forward link transmission based upon some scheduling algorithm. One such algorithm is disclosed in U.S. patent application Ser. No. 08/798,951, entitled "METHOD AND APPARATUS FOR FORWARD LINK RATE SCHEDULING", filed Feb. 11, 1997, assigned to the assignee of the present invention.

Due to the bursty nature of packet data, some users' data connections may not be active. These mobile stations enter a state known as the dormant state in many of the CDMA standards (see TIA/EIA/IS-707, *Data Service Options for Spread Spectrum Systems*). When the mobile or base station has data to send, signaling is used to place the mobile station onto the traffic channel. From time to time, users may move out of or into the cell, and others may initiate, or terminate their connection. Each mobile station, to receive data on the F-PDCH, must have the Walsh codes, also referred to as the Walsh space, being used for the F-PDCH, also. Since the Walsh space will tend to vary dynamically with time and may vary between cells (or sectors within a cell), Walsh space information will need to be relayed to the various users within each cell, including mobile stations coming out of the dormant state. There is therefore a need in the art for Walsh space assignment that effectively distributes the Walsh space to the various users while minimizing the use of system resources for its distribution.

SUMMARY

Embodiments disclosed herein address the need for Walsh space assignment that effectively distributes the Walsh space to the various users while minimizing the use of system resources for its distribution. In one aspect, a list of Walsh functions is maintained in the base station and mobile stations. A Walsh space indicator is transmitted to indicate which of the Walsh functions on the list are to be used in communication. The Walsh space indicator is updated according to the dynamically varying transmit power available or the use of Walsh functions within the base station. Methods by which a mobile station can request Walsh space information are provided. In another aspect, a Walsh space indicator channel is continually broadcast for mobile stations to detect the Walsh space indicator therefrom. In yet another aspect, the Walsh space indicator is used to initialize convolutional encoders and decoders, to provide a mechanism for mitigating against errors introduced while receiving Walsh space indicators. Various other aspects are also presented.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
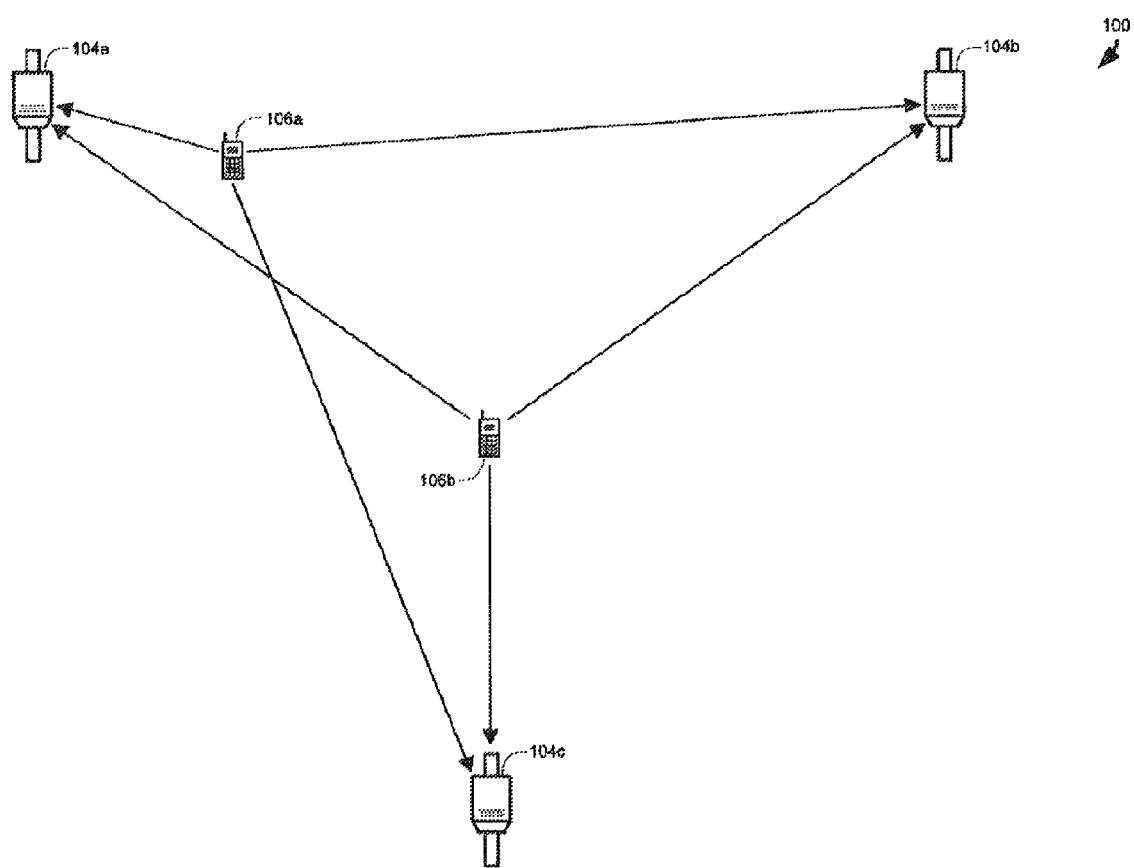
FIG. 1 is a wireless communication system that supports a number of users, and which can implement various aspects of the invention.

FIG. 1 is a diagram of a wireless communication system 100 that supports a number of users, and can implement various aspects of the invention. System 100 may be designed to support one or more CDMA standards and/or designs (e.g., the W-CDMA standard, the IS-95 standard, the IS-2000 standard, the IS-856 standard, the 1xEV-DV proposal). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the term access point. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

A common application for communication system 100 is to provide packet data service for mobiles, including a connection to the Internet. A base station 104 may comprise one or more base station transceiver subsystems (BTS), connected to a base station controller (BSC). A Packet Data Service Node (PDSN), used to send data to and receive data from a network, such as the Internet, connects to the BSC within one or more base stations to provide packet services to the mobile stations in communication therewith via on or more BTSs. Various protocols for packet data are known in the art and can be applied at the appropriate locations throughout communication system 100. These details are not shown in FIG. 1.

As described above, a system such as that described in the 1xEV-DV proposal uses the remaining transmit power, after power has been allocated to support existing channels such as voice, to transmit at the highest rate supportable to a single mobile station at a time. A 1xEV-DV system may also transmit to multiple mobile stations at the same time, a mode that is also supported within the scope of the present invention. The data channel for forward transmission is referred to as the Forward Packet Data Channel (F-PDCH). The choice of mobile station for transmission is based in large part on channel quality indicators, which are transmitted to the base station by each mobile station with a packet data connection. The channel quality indicator messages are sent to the base station on a channel referred to as the Reverse Channel Quality Indicator Channel (R-CQICH). The base station will avoid sending to a mobile station that is experiencing poor channel quality at the time, opting instead to send at high rate to another mobile station, returning to the first after the channel quality improves.

The base station uses one or more control channels in association with the forward data channel. One such channel is the Forward Primary Packet Data Control Channel (F-PPDCCH), another is the Forward Secondary Packet Data Control Channel (F-SPDCCH). Control channels can be used to convey broadcast information to all the mobiles, or targeted messages to a single mobile. A control message may indicate which mobile is to receive the data on the F-POCH, the rate, the number of packets, and similar information.

A send and re-transmit protocol can be established to ensure packets destined for mobile stations arrive as transmitted. A mobile station sends an acknowledgement to the base station when it receives a packet on the forward data channel. This acknowledgement can be sent on the Reverse Acknowledgement Channel (R-ACKCH). If an acknowledgement fails to arrive from a mobile station after the base station transmits to it, the base station can re-transmit the packet. In the exemplary embodiment, the base station will attempt to re-transmit a packet four times.

The mobile stations can also transmit data to the base station on the reverse link. One channel for reverse link data transmission is referred to as the Reverse Supplemental Channel (R-SCH). A reverse link control channel is used to indicate the rate data is transmitted on the R-SCH, referred to as the Reverse Rate Indicator Channel (R-RICH).

Data transmitted on the forward data channel, or F-PDCH, may be spread using one or more Walsh codes. In the exemplary embodiment, the data may be covered using up to 28 Walsh codes. As described above, the amount of transmission power available for F-PDCH transmission, and the number of Walsh channels needed, varies as the number of voice and other data channels varies. It is necessary for the base station to communicate to the mobile stations the number of Walsh channels being used during upcoming transmissions, which Walsh channels they are, and the order that the data will be modulated on the Walsh channels. This collective set of information can be referred to as the Walsh space.

Figure 2:
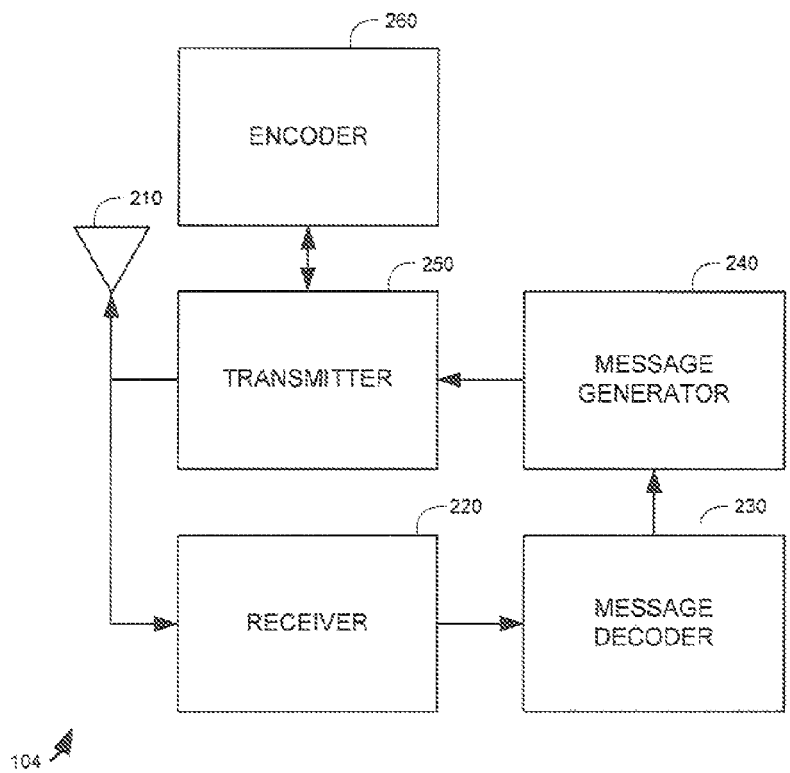
FIG. 2 depicts an exemplary base station.

FIG. 2 depicts an exemplary base station 104. For clarity, only a subset of the components relating to this description are shown. Forward link signals are transmitted from and reverse link signals are received on antenna 210. The forward link signals are generated in transmitter 250, which is shown communicatively coupled with encoder 260. Transmitter 250 may process data for transmission using a variety of techniques, known in the art. Examples of such processing include Walsh Covering, pseudo-random noise (PN) spreading, interleaving, encoding, radio-frequency (RF) processing such as up-conversion and carrier modulation, and the like. When transmitting data on the F-PDCH, transmitter 250 covers the appropriate data symbols with the corresponding Walsh functions as defined in the current Walsh space. Encoder 260 may be included as part of transmitter 250, but is shown as a separate element in FIG. 2 for clarity of discussion below. Encoder 260 can employ various encoding schemes, examples include Cyclic Redundancy Check (CRC) encoding, convolutional or block encoding, turbo encoding, and the like. Among other data that can be transmitted on the forward link via transmitter 250 and antenna 210, for example, packet data, as described above with respect to FIG. 1, are messages generated in message generator 240. Messages generated in message generator 240 may be control messages for transmission on the F-PPDCH or the F-SPDCCH, which are processed and transmitted in transmitter 250.

Reverse link signals are delivered from antenna 210 to receiver 220, where various processing, known in the art, is used to retrieve data from the reverse link signals. Examples of the processing that can be performed in receiver 220 include amplification, RF down-conversion, demodulation (including PN despreading and Walsh decovering), combining, deinterleaving, decoding, and the like.

Data from receiver 220 may have various destinations, one of which is shown as message decoder 230. Message decoder 230 can decode various messages sent from one or more mobile stations, such as those reverse link messages described above. Message generator 240 is responsive to message decoder 230, in that some forward link messages are generated in response to information carried in reverse link messages. Examples of this will be detailed in various embodiments below. Note that a typical base station may include a central processing unit (CPU) or digital signal processor (DSP) for interconnecting and managing the various functional blocks described (CPU or DSP not shown). In fact, the various blocks of FIG. 2, including the message generator 240 and message decoder 230, may be processes running on a CPU or DSP. The functional blocks shown are for clarity of discussion only, as those skilled in the art will recognize the myriad ways of implementing the blocks described herein in special purpose hardware, CPU or DSP, or combinations thereof, all within the scope of the present invention. The communicative link between the message decoder 230 and the message generator 240 may include various blocks not shown, such as the aforementioned CPU or DSP.

Figure 3:
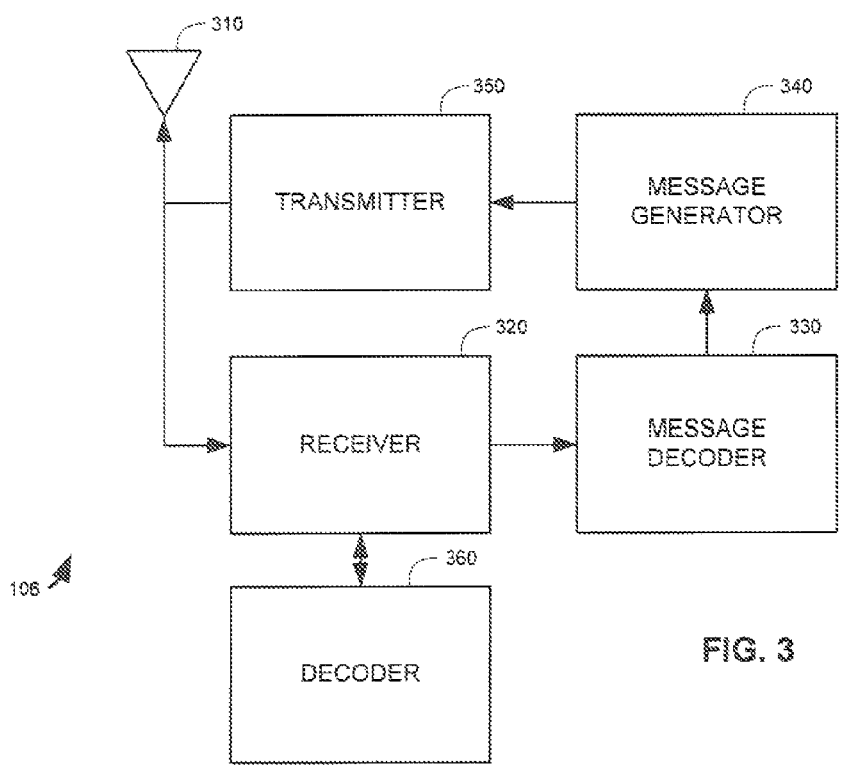
FIG. 3 depicts an exemplary mobile station.

FIG. 3 depicts an exemplary mobile station 106. For clarity, only a subset of the components relating to this description are shown. Reverse link signals are transmitted from and forward link signals are received on antenna 310. The reverse link signals are generated in transmitter 350. Transmitter 350 may process data for transmission using a variety of techniques, known in the art. Examples of such processing include Walsh Covering, pseudo-random noise (PN) spreading, interleaving, encoding, radio-frequency (RF) processing such as up-conversion and carrier modulation, and the like. Among other data that can be transmitted on the reverse link via transmitter 350 and antenna 310 are messages generated in message generator 340. Messages generated in message generator 340 may be control messages such as channel quality, acknowledgement, rate information and the like. Examples include the R-CQICH, R-ACKCH, and the R-RICH, each of which are processed and transmitted in transmitter 350.

Forward link signals are delivered from antenna 310 to receiver 320, where various processing, known in the art, is used to retrieve data from the forward link signals. Examples of the processing that can be performed in receiver 320 include amplification, RF down-conversion, demodulation (including PN despreading and Walsh decovering), combining, deinterleaving, decoding, and the like. Decoder 360 is shown communicatively coupled to receiver 320. Decoder 360 may be included as part of receiver 320, but is shown as a separate element in FIG. 3 for clarity of discussion below. Decoder 360 may decode according to one or more of a variety of decoding schemes known in the art. Examples include CRC decoders, convolutional decoders, turbo decoders, and the like. When receiving data on the F-PDCH, receiver 320 decovers the appropriate data symbols with the corresponding Walsh functions as defined in the current Walsh space.

Data from receiver 320 may have various destinations, one of which is shown as message decoder 330. Message decoder 330 can decode various messages sent from one or more base stations, such as the forward link messages described above. Message generator 340 is responsive to message decoder 330, in that some reverse link messages are generated in response to information carried in forward link messages. Examples of this will be detailed in various embodiments below. Note that a typical mobile station may include a central processing unit (CPU) or digital signal processor (DSP) for interconnecting and managing the various functional blocks described (CPU or DSP not shown). In fact, the various blocks of FIG. 3, including the message generator 340 and message decoder 330, may be processes running on a CPU or DSP. The functional blocks shown are for clarity of discussion only, as those skilled in the art will recognize the myriad ways of implementing the blocks described herein in special purpose hardware, CPU or DSP, or combinations thereof, all within the scope of the present invention. The communicative link between the message decoder 330 and the message generator 340 may include various blocks not shown, such as the aforementioned CPU or DSP.

Figure 4:
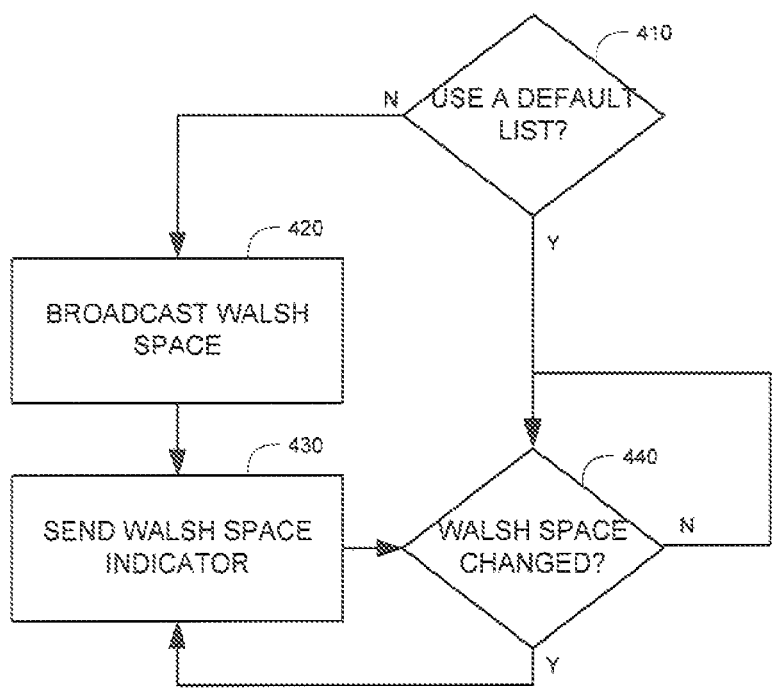
FIG. 4 is a flowchart depicting an embodiment of a method of transmitting a Walsh space indicator.

FIG. 4 depicts a flowchart of an embodiment of a method for communicating Walsh space information to mobile stations. A message is sent on a broadcast channel, referred to as a Forward Broadcast Control Channel (F-BCCH) containing the Walsh numbers and the number of channels for various forward channels, including the F-PPDCCH, the F-SPDCCH, and the F-PDCH. In the exemplary embodiment, the F-PDCH may use up to 28 Walsh functions. The list of functions for use in transmission and reception of the F-PDCH is referred to herein as the Walsh list. In an alternative embodiment, a default list is used in lieu of transmission of the Walsh list on the F-BCCH. An example of a Walsh list is shown in Table 1. In this example, the Walsh functions to be used are 31, 15, 30, 14, and so on. In addition to the Walsh list, the base station and the mobile stations need to agree on the order in which symbols are applied to the various Walsh functions, so as to facilitate proper decoding. One solution is to use the order of the Walsh list, although any method of selecting the Walsh functions falls within the scope of the present invention. Whether a default list is used is shown as decision block 410 in FIG. 4. If not, then proceed to block 420 and broadcast the Walsh space list. If a default modulation order, such as the order of the Walsh list, is not specified, that modulation order can be specified by broadcasting the modulation order, also in block 410.

TABLE 1

Default Walsh Space for F-PDCH
(in 32 Space)

31
15
30
14
29
13
28
12
27
11
26
10
25

TABLE 1-continued

Default Walsh Space for F-PDCH
(in 32 Space)

9
24
8
23
7
22
6
21
5
20
4
19
3
18
2

Once the overall Walsh space is defined, the sub-space to be used for any particular transmission on the F-PDCH can be indicated by a single number, referred to herein as a Walsh space indicator, or WALSH_SPACE. The Walsh space indicator specifies how many Walsh functions are to be used. The Walsh list, and associated modulation order, can then be used with the Walsh space indicator to identify the Walsh functions for use in data communication. An example Walsh sub-space corresponding to WALSH_SPACE equal to six is shown in Table 2. In this example six Walsh functions will be used, and they will be 31, 15, 30, 14, 29, and 13, in that order. The Walsh space must be transmitted initially to all mobile stations in block 430. Whenever the Walsh space changes, the Walsh space indicator must be sent to identify the new Walsh space. This is shown in FIG. 4 in decision block 440, where the flow loops back to decision block 440 when the Walsh space has not changed, but proceeds to block 430 to send the Walsh space indicator when it has changed.

TABLE 2

Example Walsh Space
WALSH_SPACE = 6

31
15
30
14
29
13

Any number of different tables can be supported within the scope of the present invention. Table 3 shows an alternate default Walsh Space, suitable as a default Walsh list for allocation of Walsh channels during transmission of data on a channel such as the F-PDCH.

TABLE 3

Alternative Default Walsh Space for F-PDCH
(in 32 Space)

31
15
23
7
27
11
19
3
29
13

TABLE 3-continued

Alternative Default Walsh Space for F-PDCH
(in 32 Space)

21
5
25
9
30
14
22
6
26
10
18
2
28
12
20
4
24
8

In the exemplary embodiment, the Walsh Space Indicator is sent in a message, an example of which is shown in Table 4. In this example, the message has 13 information bits with 6 bits allocated to the multiple access control identifier (MAC-ID), and 7 bits used to signal the packet structure. In the exemplary embodiment, a MAC-ID of 0 indicates control, which can be used to broadcast to all the mobiles monitoring that base station's transmissions. Of the remaining 7 bits, two are used to indicate the type of information and the remaining 5 bits indicate the number of Walsh functions being used. In this example, CON_INFO_TYPE can be used to indicate that the message contains a Walsh space indicator. WALSH_SPACE is a 5-bit number indicating the number of Walsh functions being used. The message can be sent on a control channel. In the exemplary embodiment, the Walsh Space Indicator message can be sent on the F-SPDCCH.

TABLE 4

| Field | Length (bits) | Value |
| --- | --- | --- |
| MAC_ID | 6 | 000000 |
| CON_INFO_TYPE | 2 | |
| WALSH_SPACE | 5 | |

In the 1xEV-DV proposal, messages on the control channel, such as the F-SPDCCH can be transmitted using 1, 2, or 4 slot packets. When the 8-slot F-PDCH format is used, a 4-slot F-SPDCCH format is used. Thus, it is possible to use the remaining 4 slots to transmit the WALSH_SPACE in a 4-slot F-SPDCCH message. If no 8-slot F-PDCH transmissions are being used, a Walsh Space Indicator message may need to be sent on the F-SPDCCH, using some forward link capacity.

Figure 5:
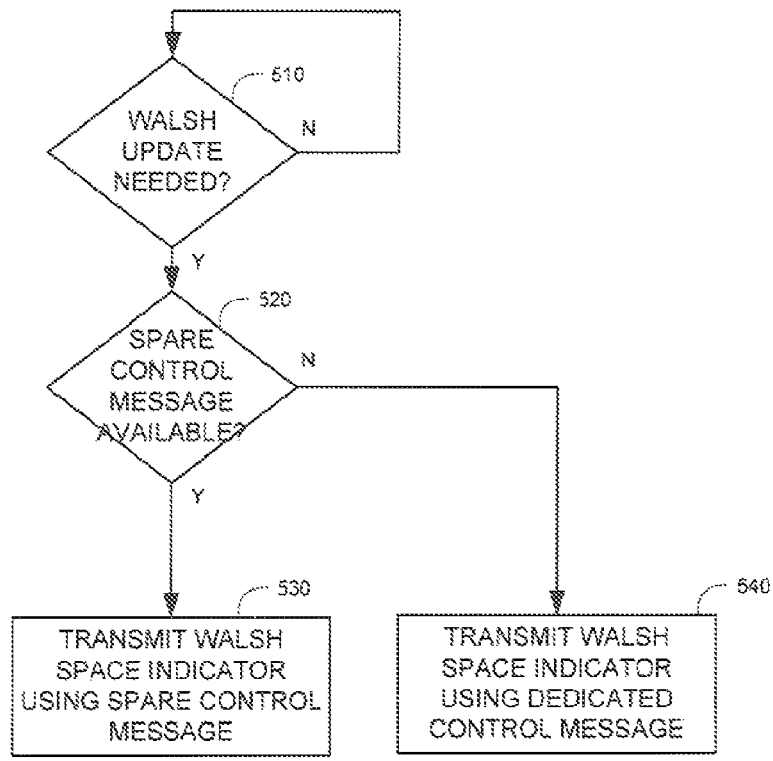
FIG. 5 is a flowchart of an embodiment of a method of optionally including a Walsh space indicator in another message packet.

A flowchart depicting an embodiment of this method is shown in FIG. 5. The flow loops back from decision block 510 to itself when a Walsh update is not required. When a Walsh update is required, proceed to decision block 520, to determine if there is time when the F-PDCH is being transmitted but a control message is not being transmitted. If so, proceed to block 530 and transmit the Walsh space indicator message using the spare control message. If not, proceed to block 540 and transmit the Walsh space indicator using a dedicated control message.

One of the situations in which the percentage of 8-slot packets is low occurs when the channel is being used for data only operation (all 28 of the Walsh codes are available). In this situation, a change in the Walsh space may require a special transmission of the Walsh Space Indicator message on the control channel, reducing overall system capacity. However, in situations such as this, the Walsh space is not changing dramatically, so the effect on overall system capacity is minimal.

The Walsh space may change more dynamically when some of the channel is allocated for voice or services other than F-PDCH services. In this case, a greater fraction of 8-slot transmissions will be available since the amount of available power is less.

In general, every time the base station changes the Walsh space, the Walsh Space Indicator should be transmitted. In the exemplary embodiment, the Walsh space information can be sent to the mobile station during call setup using the Extended Channel Assignment Message (ECAM), defined in the IS-2000 standard. If the Walsh space changes subsequently, the base station can update the mobile station using the F-SPDCCH message with the Walsh Space Indicator.

In addition, there may be circumstances in which the mobile station may want to communicate a need for the Walsh space information to the base station. For example, a mobile station may need to be updated with the Walsh space information when it hands off or requests that F-PDCH transmissions occur from a new cell or sector. There are a variety of techniques the mobile station can employ to convey this need to the base station.

Figure 6:
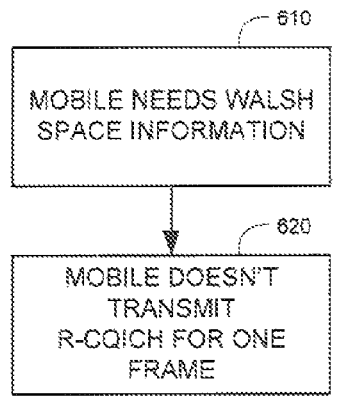
FIG. 6 depicts one method by which a mobile station can convey a need for Walsh space information to a base station.

In one embodiment, depicted in FIG. 6, the mobile needs Walsh space information, as shown in step 610. The mobile conveys this to the base station by not transmitting the reverse quality indicator, for example the R-CQICH. If the base station does not receive the R-CQICH, then it does not transmit data to the mobile station, but can instead transmit the Walsh space information. In an alternative embodiment, shown in FIG. 7, the mobile responds to the need for Walsh space information, step 710, by sending a special value on the R-CQICH, one not used for regular operation, for example. This latter arrangement is useful when transmissions from the mobile station are sometimes not received.

Either of these methods can be used to trigger the base station to send the Walsh space information on the forward link. Using the alternative method, shown in FIG. 7, the special value on the R-CQICH can be used to facilitate updating the Walsh space information during a handoff or when requesting that a cell or sector already in the active set transmit to the mobile station. The R-CQICH contains carrier-to-interference (C/I) information corresponding to a specific base station. A mobile station, subsequent to handoff, can send this special value with the new base station indication, and the base station knows that it needs to send the Walsh space information. A system using Walsh covering of C/I messages to direct the messages to a particular base station is disclosed in copending U.S. patent application Ser. No. 08/963,386, entitled "METHOD AND APPARATUS FOR HIGHER RATE PACKET DATA TRANSMISSION", filed Nov. 3, 1997, and assigned to the assignee of the present invention.

Figure 8:
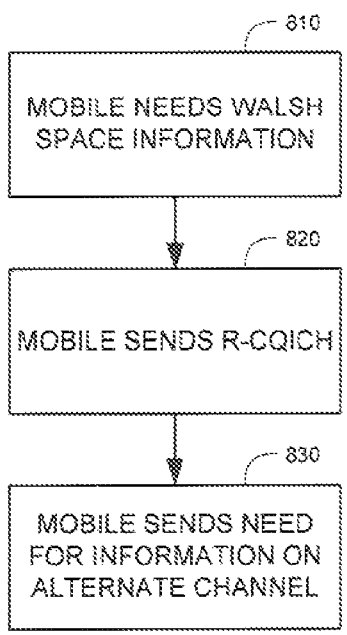
FIG. 8 depicts yet another alternate method by which a mobile station can convey a need for Walsh space information to a base station.

FIG. 8 depicts yet another method for communicating a need for Walsh space information, shown in step 810. In step 820, the mobile sends a channel quality indicator, on the R-CQICH, for example, in the normal fashion. In step 830, a special value is sent on one of the other reverse control channels. For example, a value on the rate indicator channel, such as the R-RICH, can be used which isn't otherwise used to indicate a valid rate. Alternatively, a special value can be sent on an acknowledgement channel, such as the R-ACKCH. Another way would be to have a special channel just for this function. By using another channel, the base station obtains channel quality indicator information from the mobile station and thus allows the base station to use the channel quality indicator information to select a time to transmit the Walsh space information when the channel is good. This increases the likelihood that the mobile station will accurately receive the information, reduces the amount of power to transmit the Walsh space information, or both.

In order to determine the probability of error for receiving the Walsh space information when channel quality feedback from the mobile station is not used, long term fading statistics can be used. As an example, for a 1% forward error rate (FER), the control channel requires at worst 18 dB $E_b/N_t$ (energy per bit/thermal noise), at approximately 30 km/hr in a 1-path Rayleigh fading environment. The required $E_c/I_{or}$ (energy per chip/total transmitted energy from the base station) is given by:

$$\frac{E_c}{I_{or}} = \left(\frac{E_b}{N_t}\right)\left(\frac{R}{W}\right)\left(\frac{1}{G}\right) \qquad \text{Equation 1}$$

where R is the data rate, W is the transmission bandwidth, and G is the geometry (ratio of power from cell the mobile station is monitoring to all other cells), in dB. A message contains 29 bits, thus the required $E_c/I_{or}$ for a 1-slot case is 0.7 dB-G. It is clear that there is insufficient power for detection near the cell edge (G is 0 dB or less). However, if the Walsh space information is repeated, and a 1% FER is desired after two repeats (and assuming fading is independent between repeats), then the required $E_b/N_t$ is about 8 dB and the required $E_c/I_{or}$ for a 1-slot case is −10.3 dB-G. The total energy, in terms of $E_c/I_{or}$, is −7.3-G. Thus, by using a relatively large portion of the channel power, the Walsh space indication can be reliably transmitted to the mobile station. Alternative embodiments, which do not require such a large portion of the channel power for reliable transmission are discussed below.

An alternative method for communicating the Walsh space information is to use a continuously transmitted code division multiplexed channel. This channel will be referred to herein as the Forward Walsh Indicator Channel, or F-WICH. Using this method has the benefits of allowing the Walsh space to be transmitted at lower power. The mobile station can combine energy from the repetition of the Walsh space information. The time diversity introduced by repeating the information can smooth over fading processes. Furthermore, mobile stations do not need to convey a need for the Walsh space information to the base station, since the information is being continuously broadcast.

In the exemplary embodiment, a 20 ms frame and a length 256 Walsh function can be used for the F-WICH. There will be 96 available symbols per frame. A simple block code can be used, such as a (24, 7) code repeated four times, similar to that used for the R-RICH, as defined in the 1xEV-DV proposal.

Figure 9:
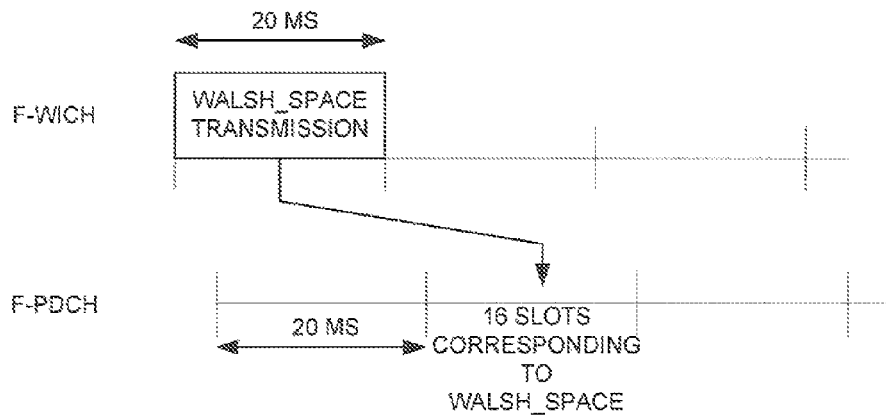
FIG. 9 shows the timing relationship between a transmission of WALSH_SPACE on the F-WICH and the use of that WALSH_SPACE on the F-PDCH.

The base station continually sends the F-WICH. When the Walsh space changes, the base station transmits the new Walsh Space Indicator one frame plus several (e.g., two) slots in advance of the actual change on the air. In the context of the IS-95 and cdma2000 air interfaces, a slot is equal in duration to a power control group, the length of both being 1.25 ms. FIG. 9 shows this relative timing. WALSH_SPACE is transmitted on the F-WICH. 20 ms plus some number (e.g., two) slots later the 16 slots corresponding to the updated WALSH_SPACE are transmitted on the F-PDCH.

The mobile station decodes the F-WICH every frame. If the F-WICH is not received correctly, there are a variety of strategies that the mobile station can use. One is to assume the previous value of WALSH_SPACE, which is useful if the WALSH_SPACE does not change very frequently. A second is to just wait for the new F-WICH transmission. Other techniques, such as those described above in relation to FIGS. 6-8 that can be used by the mobile station to let the base station know. While, as stated above, it is not necessary for the base station to know that the mobile station did not receive the Walsh information correctly, because that information is continuously being transmitted, there are other considerations which may make such communication useful.

Figure 7:
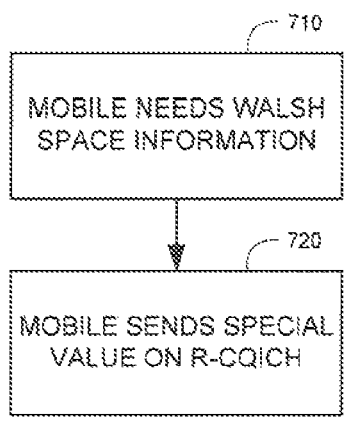
FIG. 7 depicts an alternate method by which a mobile station can convey a need for Walsh space information to a base station.

For example, in the 1xEV-DV proposal, a retransmission scheme is used such that a packet may be delivered to a mobile station up to four times, waiting for an acknowledgement of the packet. If the mobile station does not have the correct Walsh space, then all four transmissions will most likely be received in error (even if the channel was good during the transmissions). An upper layer retransmission protocol (e.g., RLP) will correctly handle this situation, but system resources and capacity are squandered while transmitting to a mobile station incapable of receiving. So a base station may wish to receive an indication from a mobile station that the Walsh space was not received, so to avoid transmitting until the mobile station will be able to receive once again. The mobile station can communicate this by not transmitting the channel quality indicator, such as the R-CQICH as is shown in FIG. 6. Or, a special value of the channel quality indicator can be transmitted as is shown in FIG. 7. Other alternate reverse channels can also be used to indicate the lack of valid Walsh space decoding by the mobile station, such as the reverse rate indicator, or R-RICH, or the acknowledgment channel, or R-ACKCH.

If the mobile station does not correctly receive the Walsh space indicator on the F-WICH in one frame, it can combine the code symbols that were received in the previous frame with those in the current frame. This provides an additional 3 dB of energy for decoding the Walsh space indicator. However, if the Walsh space indicator changed from one transmission to the next, then there is a high likelihood that the transmission would not be decoded. Thus, one would likely use this type of approach when the Walsh space indicator does not change very often.

Figure 10:
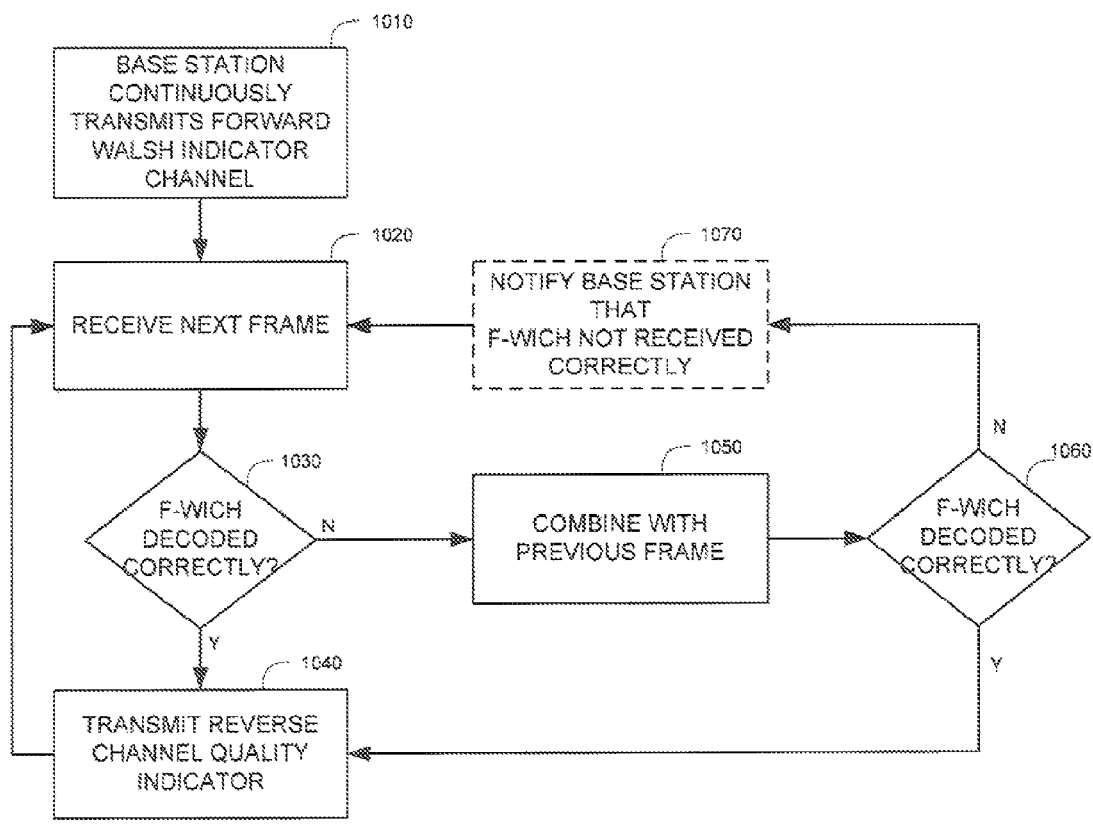
FIG. 10 is a flowchart of an embodiment of a method of receiving the F-WICH.

A flowchart depicting an exemplary embodiment of a method for sending and receiving the F-WICH is shown in FIG. 10. Block 1010 indicates that the base station continuously transmits the F-WICH. Proceed to block 1020, where the mobile station receives the next frame of the F-WICH. Proceed to decision block 1030. If, in decision block 1030, the F-WICH was decoded correctly, proceed to block 1040 to transmit the reverse channel quality indicator, on the R-CQICH, for example. Proceed back to block 1020 to receive the next frame.

If, in decision block 1030, the F-WICH was not decoded correctly, proceed to block 1050, and combine the symbols from the frame with the symbols from the previous frame. Proceed to decision block 1060. In decision block 1060, if the F-WICH is decoded correctly from the combined symbols, proceed to block 1040 and transmit the reverse channel quality indicator, as described above. If the combined symbols do not decode correctly, proceed to block 1020 to receive the next frame, as described above, or proceed to optional block 1070 (shown in dashed outline), to notify the base station that the F-WICH was not received correctly. Various methods for notifying the base station have been described above, including refraining from transmitting the reverse channel quality indicator, sending a special channel quality indicator value, sending a special value on another reverse channel, and the like. From block 1070, proceed to block 1020 to receive the next frame. Table 6 outlines the various possible outcomes using somewhat different decision rules, using decoding results for two sequential frames, labeled i−1 and i.

An alternative embodiment, using a separate code division multiplexed channel, such as the F-WICH, can be used to mitigate the problems associated with a mobile station receiving an incorrect WALSH_SPACE value on the F-WICH. In one embodiment, a cyclic redundancy check (CRC) encoder in the base station and mobile station are initialized using the current value of WALSH_SPACE. For example, encoder 260 in the base station and decoder 360 in the mobile station can be used to calculate the appropriate CRC. If the mobile station has not updated its version of WALSH-SPACE correctly when the base station has changed it, it is very unlikely that the packet header will be correctly decoded on the F-SPDCCH. As a result, the mobile station will not receive the sub-packet for that transmission. As one possible alternative, the initial state of the error correcting encoder (e.g., convolutional encoder) in the base station (260) and the mobile station (360) are initialized using the current value of WALSH SPACE. It should be understood, that other rules described here (such as those given in FIG. 10 or Table 6) can also be used with this alternative embodiment.

TABLE 6

| Outcome for frame i-1 | Outcome for frame i | Action to be taken |
| --- | --- | --- |
| Good | Good | Use WALSH_SPACE from frame i. |
| Bad | Good | Use WALSH_SPACE from frame i. |
| Good | Bad | Use WALSH_SPACE from frame i-1 (note that the F-SPDCCH header will not likely be decoded correctly if WALSH_SPACE has changed. |
| Bad | Bad | Combine energy from both frame i-1 and frame i. If it decodes properly, then use WALSH_SPACE from the combined frames. If not, use the last previously available WALSH_SPACE. Again, the F-SPDCCH header will not likely be decoded correctly if WALSH_SPACE has changed. |

As before, if the mobile station does not have the correct WALSH_SPACE indication, perhaps due to handoff, or errors received in an update on the F-WICH, the mobile station can alert the base station using any of the techniques, such as those discussed above with relation to FIGS. 6-8. The base station can then avoid sending data to that mobile station until it has correctly received the WALSH_SPACE. This avoids wasting system resources by transmitting data to a mobile station incapable of correctly receiving it.

Figure 11:
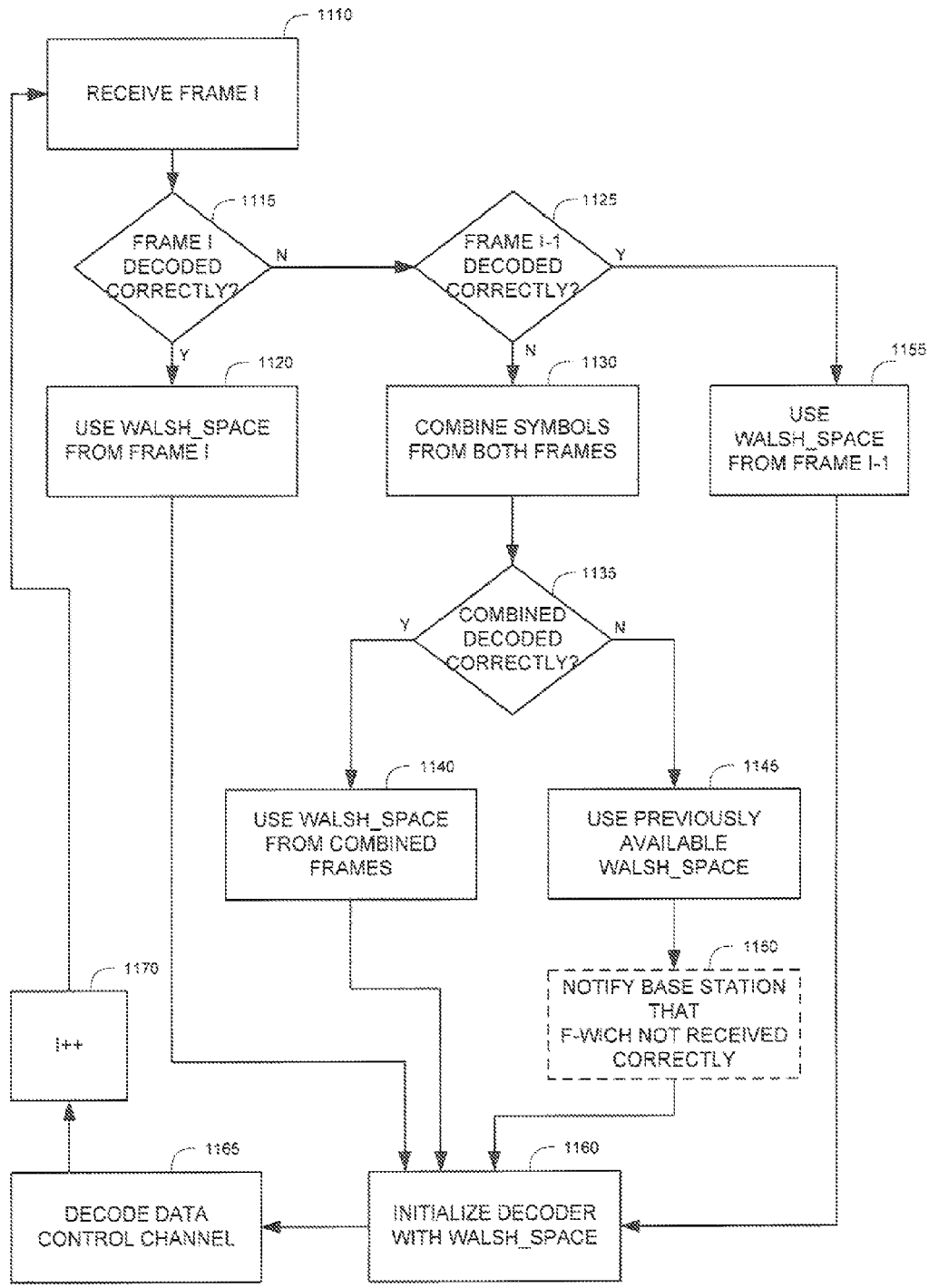
FIG. 11 is a flowchart of an embodiment of a method of receiving the F-WICH and using convolutional decoder initialization as an interlock for mitigating errors received on the F-WICH.

FIG. 11 depicts a flowchart of an embodiment of the method just described. The mobile station receives frame i in block 1110. Proceed to decision block 1115 to determine if frame i decoded correctly. If so, use the WALSH_SPACE included in frame i. Initialize the decoder with WALSH_SPACE in block 1160, decode the data control channel in block 1165, increment i in block 1170, proceed to receive the next frame i in block 1110, and repeat the process.

If frame i did not decode correctly in decision block 1115, proceed to decision block 1125 to determine if the prior frame, i−1, decoded correctly. If so, proceed to block 1155 and use the WALSH_SPACE from the prior frame. There is no need to combine the frames, because if the Walsh space has not changed, the prior value of WALSH_SPACE is valid, and if it has changed, combining the two different values will likely be in error anyway. If the Walsh space has changed, then the control channel will very likely not be decodable since the decoder initialization will not be current. Initialize the decoder with WALSH_SPACE in block 1160, decode the data control channel in block 1165, increment i in block 1170, proceed to receive the next frame i in block 1110, and repeat the process.

If, in decision block 1125, the prior frame, i−1, did not decode correctly, proceed to block 1130 to combine the symbols from both frames. Proceed to decision block 1135 to determine if the combined frame decoded properly. If so, use the WALSH_SPACE from the combined frames. Initialize the decoder with WALSH_SPACE in block 1160, decode the data control channel in block 1165, increment i in block 1170, proceed to receive the next frame i in block 1110, and repeat the process.

If, in decision block 1135, the combined frame did not decode properly, then proceed to block 1145. Use the previously available WALSH_SPACE. If the Walsh space has not changed, then this value will be valid. If it has changed, then, as before, the control channel will not be decoded properly using this WALSH_SPACE value as the decoder initialization. Initialize the decoder with WALSH_SPACE in block 1160, decode the data control channel in block 1165, increment i in block 1170, proceed to receive the next frame i in block 1110, and repeat the process. Alternatively, as shown by optional block 1150 between blocks 1145 and 1160 (shown in dashed outline), the mobile station can notify the base station that the F-WICH was not received correctly, using any of the methods described above. It should be noted that alternative embodiments could have block 1150 notify the base station that the F-WICH has not been received correctly anytime that the mobile station did not correctly receive the F-WICH.

Normally, a high reliability channel would require a great deal of transmission power, particularly in a slow fading environment. However, the power required for a continuously transmitted F-WICH is lower. This is because the WALSH_SPACE is repeated, thus providing effective interleaving, in the exemplary embodiment, of 40 ms. Furthermore, if the mobile station is in a fade, then the carrier-to-interference (C/I) is low and the base station would not transmit to the mobile station on the packet data channel, such as the F-PDCH. Thus, there is no need for the mobile station to have the correct Walsh space information. The correct Walsh space information is only required when the channel gets better, such that the base station may select that mobile station for transmission.

In an exemplary embodiment, an $E_b/N_t$ of about 4 dB may be adequate for this channel. Since the transmission rate is quite low, the required $E_c/I_{or}$ may be about −33 dB. Such an $E_c/I_{or}$ takes very little forward link capacity to support.

The various embodiments of the present invention, some of which are described above, can also be applied to handoff situations. Prior to handoff, a base station may send a variety of messages to a mobile station. The NGHBR_CONFIG field of the Universal Neighbor List Message (UNLM) or other Neighbor List Message indicates whether the F-PPDCCH and the F-SPDCCH are present and their Walsh assignments are the same as those in the current base station. For example, if the NGHBR_CONFIG field is equal to '000', then they are the same. Rather than reusing the NGHBR_CONFIG fields of the UNLM, a new field, NGHBR_CONFIG_PDCH can be created to convey the information. In this case, a single bit could indicate whether the F-PPDCCH and the F-SPDCCH are present and their Walsh assignments are the same as the current base station.

When a mobile station receives a handoff message from a base station, the base station typically sends the Extended Neighbor List Update Message (ENLUM) immediately after the handoff. In this message, the base station can include the following information: whether the F-PPDCCH and the F-SPDCCH are present, the Walsh assignments of the F-PPDCCH and the F-SPDCCH, and the F-PDCH Walsh list. Note that a single bit can be used to represent the first two items. Two more bits can be used; the first to indicate whether the default F-PDCH Walsh list is used, the second to indicate whether the existing (if different than the default) F-PDCH Walsh list can be used. If the default or existing F-PDCH Walsh list is not used, then the base station must send the mobile station the F-PDCH Walsh list. As an alternative to the Extended Neighbor List Update Message, the base station can send this information in a handoff message, such as the Handoff Direction Message.

Figure 12:
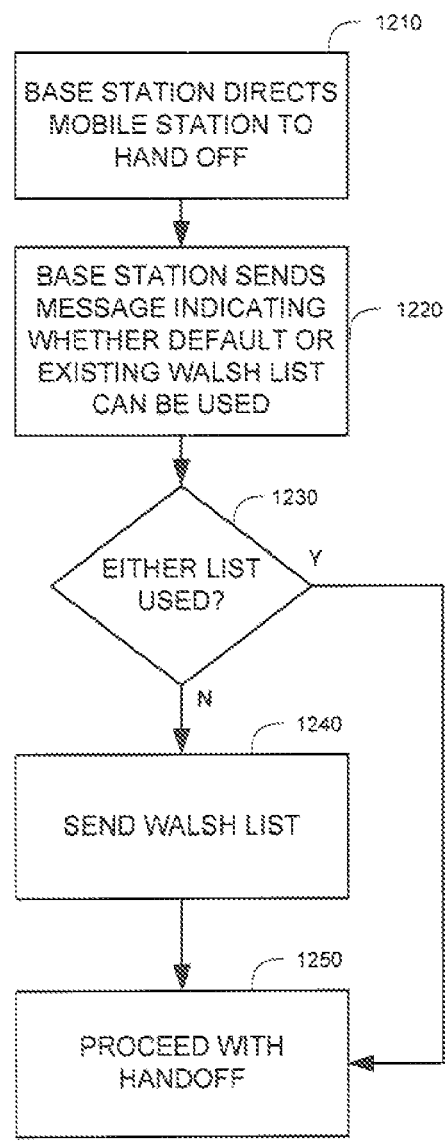
FIG. 12 is a flowchart depicting an embodiment of a method of conveying the Walsh space information during handoff.

FIG. 12 depicts a flowchart of an embodiment of this handoff method. In block 1210, the base station directs the mobile station to hand off. In block 1220, the base station sends a message indicating whether the default or the existing Walsh list can be used. Proceed to decision block 1230 to determine whether either list can be used. If so, proceed to block 1250 and proceed with the handoff, using whichever of the lists is valid. If not, proceed to block 1240 and send an updated Walsh list for the mobile station to use. Then proceed with the handoff in block 1250.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of Walsh space assignment comprising:
    sending a Walsh space indicator from a base station to one or more mobile stations, the Walsh space indicator configured as a single number identifying a plurality of Walsh functions forming a sub-space, of Walsh space to be used for particular transmissions by specifying a quantity of Walsh functions, for use in data demodulation of the particular transmissions, from a programmed list of Walsh functions.

2. The method of claim 1, further comprising loading the programmed list of Walsh functions at the base station and the one or more mobile stations with a pre-defined list, of Walsh functions.

3. The method of claim 1, further comprising sending a list of Walsh functions from the base station to the one or more mobile stations for programming the list of Walsh functions.

4. The method of claim 1, further comprising:
    changing the Walsh space indicator in response to varying available transmit power; and
    re-sending the Walsh space indicator subsequent to changes therein.

5. The method of claim 1, further comprising:
    changing the Walsh space indicator in response to a varying number of available Walsh functions; and
    re-sending the Walsh space indicator subsequent to changes therein.

6. The method of claim 5, wherein the Walsh space indicator controls the number of Walsh functions used for a packet channel.

7. The method of claim 5, wherein the number of available Walsh functions varies according to assigned data and voice channels.

8. The method of claim 1, wherein the Walsh space indicator is sent in response to a request from one or more mobile stations.

9. The method of claim 1, wherein the Walsh space indicator is included in available space in an unrelated message.

10. The method of claim 1, further comprising sending a handoff message including a field indicating whether the programmed list of Walsh functions can be used in communicating with a neighboring base station.

11. A method of Walsh space assignment comprising:
computing a Walsh space indicator configured as a single number identifying a plurality of Walsh functions forming a sub-space of Walsh space to be used for particular transmissions by specifying a number of Walsh functions, for use in data demodulation of the particular transmissions, from a programmed list of Walsh functions; and
continuously transmitting the Walsh space indicator from a base station to one or more mobile stations.

12. The method of claim 11, further comprising:
changing the Walsh space indicator in response to the varying number of Walsh functions available.

13. A method of Walsh space assignment comprising signaling a request for transmission of Walsh space information identifying an overall Walsh space configured for a Walsh space indicator configured as a single number to identify a plurality of Walsh functions forming a sub-space of the Walsh space to be used for particular transmissions by specifying a quantity of Walsh functions, for use in demodulation of the particular transmissions, from a programmed list of Walsh functions.

14. The method of claim 13, wherein the signaling comprises suppressing the transmission of a channel quality indicator.

15. The method of claim 13, wherein the signaling comprises transmitting a channel quality indicator value not associated with channel quality.

16. The method of claim 13, wherein the signaling comprises transmitting a unique value on a reverse channel.

17. The method of claim 16, further comprising:
transmitting a channel quality indicator on the reverse channel; and
transmitting the Walsh space information on the forward channel when the channel quality indicator indicates that the channel exceeds a quality threshold.

18. A method for receiving a Walsh indicator channel, including a Walsh space indicator, periodically transmitted from a base station, comprising decoding the Walsh indicator channel to detect a Walsh space indicator configured as a single number identifying a plurality of Walsh functions forming a sub-space of the Walsh space to be used for particular transmissions by specifying a quantity of Walsh functions, for use in demodulation of the particular transmissions, from a programmed list of Walsh functions.

19. The method of claim 18, further comprising signaling the base station with a Walsh space indicator detection acknowledgement.

20. The method of claim 19, further comprising suppressing transmission from the base station in response to a negative Walsh space indicator detection acknowledgement.

21. The method of claim 18, wherein the decoding step comprises decoding a time period of the Walsh indicator channel.

22. The method of claim 21, the decoding step further comprising:
combining a second time period of the Walsh indicator channel with the first time period of the Walsh indicator channel when the Walsh space indicator is not detected; and
decoding the combined time periods of the Walsh indicator channel to detect a Walsh Space indicator.

23. The method of claim 19, wherein the signaling step comprises transmitting a Channel quality indicator when the Walsh space indicator is detected.

24. A method for Walsh space assignment, comprising:
transmitting a Walsh space indicator configured as a single number identifying a plurality of Walsh functions forming a sub-space of Walsh space to be used for particular transmissions by specifying a quantity of Walsh functions, for use in demodulation of the particular transmissions, from a programmed list of Walsh functions;
encoding messages, the encoding initialized with the Walsh space indicator; and
transmitting the encoded messages.

25. The method of claim 24 wherein the encoding is convolutional encoding.

26. The method of claim 24 wherein the encoding is turbo encoding.

27. The method of claim 24, further comprising:
receiving the Walsh space indicator;
receiving the encoded messages; and
decoding the encoded messages using the Walsh space indicator to initialize the decoding.

28. A method for data communication, in a system including a base station transmitting a control channel and a periodically transmitted Walsh indicator channel, including a Walsh space indicator, comprising:
decoding a first period of the Walsh indicator channel to detect the Walsh space indicator configured as a single number identifying a plurality of Walsh functions forming a sub-space of Walsh space to be used for particular transmissions by specifying a quantity of Walsh functions, for use in demodulation of the particular transmissions, from a programmed list of Walsh functions.

29. The method of claim 28, further comprising decoding a second period of the Walsh indicator channel to detect the Walsh space indicator if the Walsh space indicator is not detected in the first period.

30. The method of claim 29, further comprising:
combining the first and second periods of the Walsh indicator channel if the Walsh space indicator, is not detected in the first, or second periods; and
decoding the combined periods to detect the Walsh space indicator.

31. The method of claim 30, further comprising selecting a previously available Walsh, space indicator if the Walsh space indicator is not detected in, the first, second, or combined periods.

32. The method of claim 28, further comprising decoding the control channel using the Walsh space indicator as an initialization value.

33. The method of claim 28, further comprising sending a message to the base station indicating that the Walsh space indicator was not detected if the Walsh space indicator is not detected in the first, second, or combined periods.

34. A base station, communicatively coupled with a plurality of mobile stations, the base station and each of the plurality of mobile stations containing a list of Walsh functions, one or more of the Walsh functions for use in data communication, the base station comprising:

a message generator for generating a Walsh space indicator message, the Walsh space indicator message including a Walsh space indicator configured as a single number identifying a plurality of Walsh functions forming a sub-space of Walsh space to be used for particular transmissions by specifying a subset of the list of Walsh functions for use in data communication.

35. The base station of claim 34, wherein the Walsh space indicator is an integer k, the subset of the list of Walsh functions being the first k Walsh functions in the list.

36. The base station of claim 34, further comprising an encoder, the encoder initialized with the Walsh space indicator prior to encoding of messages therewith.

37. The base station of claim 34, wherein the message generator inserts the Walsh space indicator in unused space in a message other than a Walsh space indicator message.

38. The base station of claim 34, further comprising a message decoder.

39. The base station of claim 38, wherein the message decoder decodes messages requesting transmission of the Walsh space indicator.

40. The base station of claim 38, wherein the message decoder decodes messages acknowledging whether the Walsh space indicator was received correctly.

41. A mobile station, communicatively coupled with a base station, the base station and the mobile station containing a list of Walsh functions, one or more of the Walsh functions for use in data communication, the mobile station comprising:
a message decoder for decoding a Walsh space indicator message, the Walsh space indicator message including a Walsh space indicator configured as a single number identifying a plurality of Walsh functions forming a sub-space of Walsh space to be used for particular transmissions by specifying a subset of the list of Walsh functions for use in data communication.

42. The mobile station of claim 41, wherein the Walsh space indicator is an integer k, the subset of the list of Walsh functions being the first k Walsh functions in the list.

43. The mobile station of claim 41, further comprising a decoder, the decoder initialized with the Walsh space indicator prior to decoding of messages therewith.

44. The mobile station of claim 41, further comprising a message generator for generating a message requesting Walsh space information.

45. The mobile station of claim 44, wherein the message requesting Walsh space information is a channel quality indicator message with a unique value not associated with channel quality.

46. The mobile station of claim 45, wherein the message decoder comprises:
means for storing a prior message;
means for combining the stored prior message with a current message, the combined messages for use in message decoding.

47. The mobile station of claim 44, wherein the message requesting Walsh space information is a rate indicator message with a unique value not associated with a rate.

48. The mobile station of claim 44, wherein the message requesting Walsh space information is an acknowledgement message with a unique value not associated with data acknowledgement.

49. The mobile station of claim 44, wherein:
the message decoder generates an error signal when the decoding of the Walsh space indicator message is unsuccessful; and
the message generator generates the message requesting Walsh space information in response to the error signal.

50. A communication system comprising:
means for sending a Walsh space indicator from a first station to a second station, the Walsh space indicator configured as a single number identifying a plurality of Walsh functions forming a sub-space of Walsh space to be used for particular transmissions by specifying a quantity of Walsh functions, for use in demodulation of the particular transmissions, from a programmed list of Walsh functions.

51. Processor readable non-transitory media operable to perform the following step:
sending a Walsh space indicator from a first station to a second station, the Walsh space indicator configured as a single number identifying a plurality quantity of Walsh functions forming a sub-space of Walsh space to be used for particular transmissions by specifying a quantity of Walsh functions, for use in demodulation of the particular transmissions, from a programmed list of Walsh functions.

* * * * *